United States Patent
Ma et al.

(10) Patent No.: US 11,429,537 B2
(45) Date of Patent: Aug. 30, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Chun Ma, Beijing (CN); Baote Zhuo, Beijing (CN); Haiying Tang, Beijing (CN); Zhihui Qiu, Beijing (CN); Sihang Xia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 302 days.

(21) Appl. No.: 16/790,380

(22) Filed: Feb. 13, 2020

(65) Prior Publication Data
US 2020/0341911 A1    Oct. 29, 2020

(30) Foreign Application Priority Data
Apr. 25, 2019 (CN) .......................... 201910341038.8

(51) Int. Cl.
| | |
|---|---|
| *G06F 11/00* | (2006.01) |
| *G06F 12/12* | (2016.01) |
| *G06F 3/06* | (2006.01) |
| *G06F 11/14* | (2006.01) |
| *G06F 11/16* | (2006.01) |
| *G06F 11/30* | (2006.01) |

(52) U.S. Cl.
CPC ............ *G06F 12/12* (2013.01); *G06F 3/0619* (2013.01); *G06F 3/0629* (2013.01); *G06F 3/0689* (2013.01); *G06F 11/1435* (2013.01); *G06F 11/1612* (2013.01); *G06F 11/1658* (2013.01); *G06F 11/3034* (2013.01); *G06F 2211/104* (2013.01); *G06F 2212/1032* (2013.01)

(58) Field of Classification Search
CPC ............ G06F 11/1435; G06F 11/1612; G06F 11/2247; G06F 11/2289; G06F 3/0619; G06F 3/0629; G06F 2211/104; G06F 21/57; G06F 8/71
See application file for complete search history.

(56) References Cited

U.S. PATENT DOCUMENTS

| | | | |
|---|---|---|---|
| 7,562,250 B2 | 7/2009 | Wahl et al. | |
| 7,873,619 B1 | 1/2011 | Faibish et al. | |

(Continued)

*Primary Examiner* — Marc Duncan
(74) *Attorney, Agent, or Firm* — BainwoodHuang

(57) ABSTRACT

Techniques involve managing a storage system. In accordance with the techniques, a plurality of copies of metadata of the storage system are read from a plurality of storage devices in a resource pool of the storage system. The resource pool includes a first number of storage devices, and the metadata describes configuration information of the storage system. A second number of copies are selected from the plurality of copies based on version information in the plurality of copies, where the second number of copies comprises the metadata in the same version. It is determined whether a relation between the first number and the second number satisfies a predetermined condition. The second number of copies are identified as trusted metadata based on determining the relation satisfies the predetermined condition. With the foregoing example implementation, the metadata in the storage system may be managed with higher reliability.

21 Claims, 9 Drawing Sheets

(56) References Cited

U.S. PATENT DOCUMENTS

| | | |
|---|---|---|
| 8,095,577 B1 | 1/2012 | Faibish et al. |
| 8,352,431 B1 | 1/2013 | Protopopov et al. |
| 9,384,082 B1 | 7/2016 | Lee et al. |
| 9,594,514 B1 | 3/2017 | Bono et al. |
| 9,697,219 B1 | 7/2017 | Wang et al. |
| 10,037,251 B1 | 7/2018 | Bono et al. |
| 10,705,918 B1 | 7/2020 | Hu et al. |
| 10,956,052 B1 | 3/2021 | Chen et al. |
| 10,970,172 B2 | 4/2021 | Shani et al. |
| 10,976,942 B2 | 4/2021 | Zhao et al. |
| 11,163,468 B2 | 11/2021 | O Mahony et al. |
| 11,258,839 B2 | 2/2022 | Paduroiu et al. |
| 2006/0106898 A1* | 5/2006 | Frondozo ............ G06F 11/1435 |
| 2008/0320058 A1* | 12/2008 | Benhase ............. G06F 11/2097 |
| 2011/0161335 A1* | 6/2011 | Dash .................... G06F 16/182 |
| | | 707/E17.014 |
| 2014/0115309 A1* | 4/2014 | Grusy .................. G06F 3/0689 |
| | | 713/2 |
| 2018/0081768 A1* | 3/2018 | Maheshwar ........ G06F 11/2094 |

\* cited by examiner

METHOD, DEVICE, AND COMPUTER PROGRAM PRODUCT FOR MANAGING STORAGE SYSTEM

CROSS REFERENCE TO RELATED APPLICATION

This application claims priority to Chinese Patent Application No. CN2019/0341038.8, on file at the China National Intellectual Property Administration (CNIPA), having a filing date of Apr. 25, 2019, and having "METHOD, DEVICE, AND COMPUTER PROGRAM PRODUCT FOR MANAGING STORAGE SYSTEM" as a title, the contents and teachings of which are herein incorporated by reference in their entirety.

FIELD

Various implementations of the present disclosure generally relate to storage management, and more specifically, to a method, device and computer program product for managing reserved storage areas in a storage system (e.g., Redundant Array of Independent Disks (RAID)).

BACKGROUND

With the development of data storage techniques, various data storage devices now provide users with increasingly large data storage capacity, and their data access speed has been improved greatly. With the increase of data storage capacity, users also impose greater demands on data reliability and response time of storage systems. So far a variety of data storage systems based on Redundant Arrays of Independent Disks have been developed to improve reliability of data. When one or more disks in a storage system fail(s), data in failed disk(s) can be recovered from other normal disk.

It will be understood the storage system might be restarted, at which point the configuration of the storage system needs to be restored based on stored metadata. Therefore, it becomes a hot research topic regarding how to store metadata with higher reliability.

SUMMARY

Therefore, it is desirable to develop and implement a technical solution for managing a storage system more effectively. It is desired that the technical solution can be compatible with an existing storage system and manage the storage system more effectively by reconstructing various configurations of the existing storage system.

According to a first aspect of the present disclosure, there is provided a method for managing a storage system. In the method, a plurality of copies of metadata of the storage system are read from a plurality of storage devices in a resource pool of the storage system, here the resource pool includes a first number of storage devices, and the metadata describes configuration information of the storage system. A second number of copies are selected from the plurality of copies based on version information in the plurality of copies, here the second number of copies comprise the metadata in the same version. It is determined whether a relation between the first number and the second number satisfies a predetermined condition. The second number of copies are identified as trusted metadata based on determining the relation satisfies the predetermined condition.

According to a second aspect of the present disclosure, there is provided a device for managing a storage system, including: at least one processor; a volatile memory; and a memory coupled to the at least one processor, the memory having instructions stored thereon, the instructions, when executed by the at least one processor, causing the apparatus to perform acts. The acts include: reading a plurality of copies of metadata of the storage system from a plurality of storage devices in a resource pool of the storage system, the resource pool including a first number of storage devices, and the metadata describing configuration information of the storage system; selecting a second number of copies from the plurality of copies based on version information in the plurality of copies, the second number of copies including the metadata in the same version; determining whether a relation between the first number and the second number satisfies a predetermined condition; and identifying the second number of copies as trusted metadata based on determining the relation satisfies the predetermined condition.

According to a third aspect of the present disclosure, there is provided a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

Figure 1:
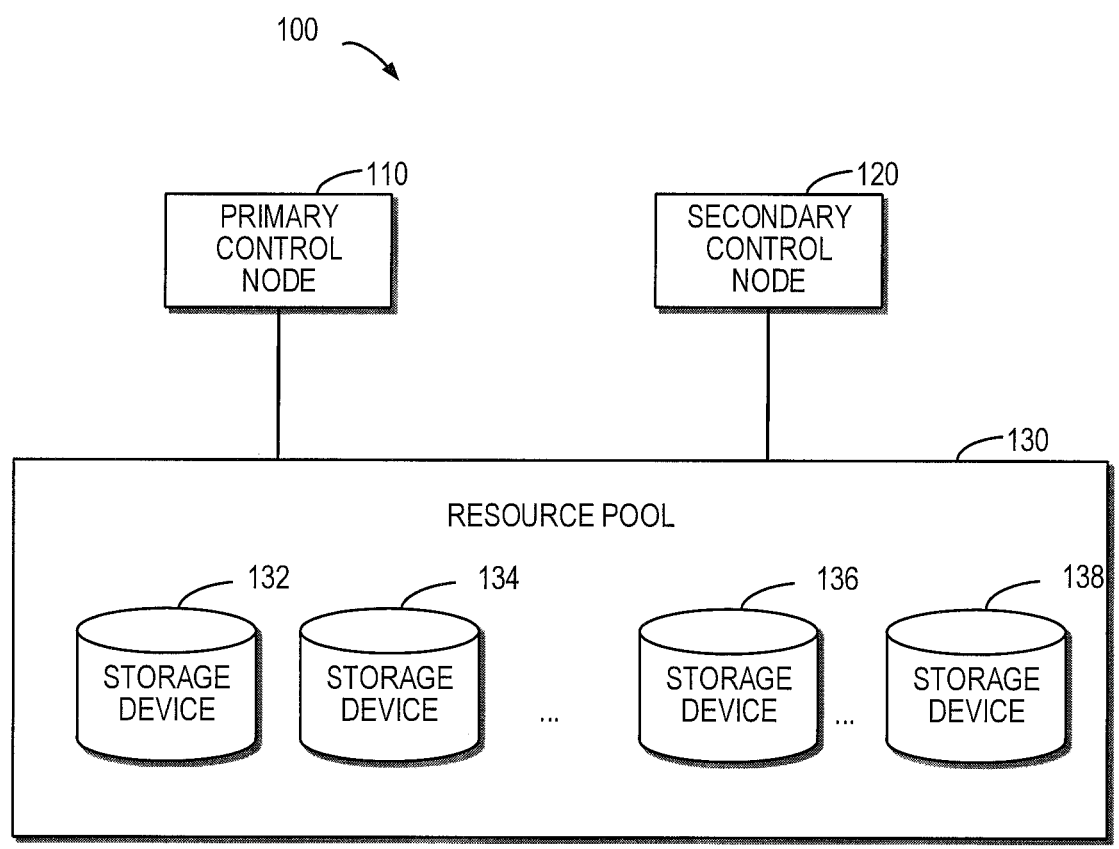
FIG. 1 illustrates a schematic view of a storage system in which example implementations of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1 illustrates a schematic view of a storage system 100 in which example implementations of the present disclosure may be implemented. As depicted, the storage system may include two control nodes, i.e., a primary control node 110 and a secondary control node 120. The two control nodes may response in parallel to users' access requests for the storage system 100. The storage system 100 may include a resource pool 130, which may include multiple storage devices 132, 134, 136, ..., 138. It will be understood depending on different RAID levels, the number of storage devices needs to satisfy the requirement of minimum. For example, regarding 4D+1P RAID-5, the resource pool at least includes 5 storage devices. Further, for the sake of management of storage devices in the resource pool, a maximum is usually set for the number of storage devices. During the actual running of the storage system 100, the number of storage devices in the storage system 100 may be specified according to different requirements of the storage system 100.

Figure 2:
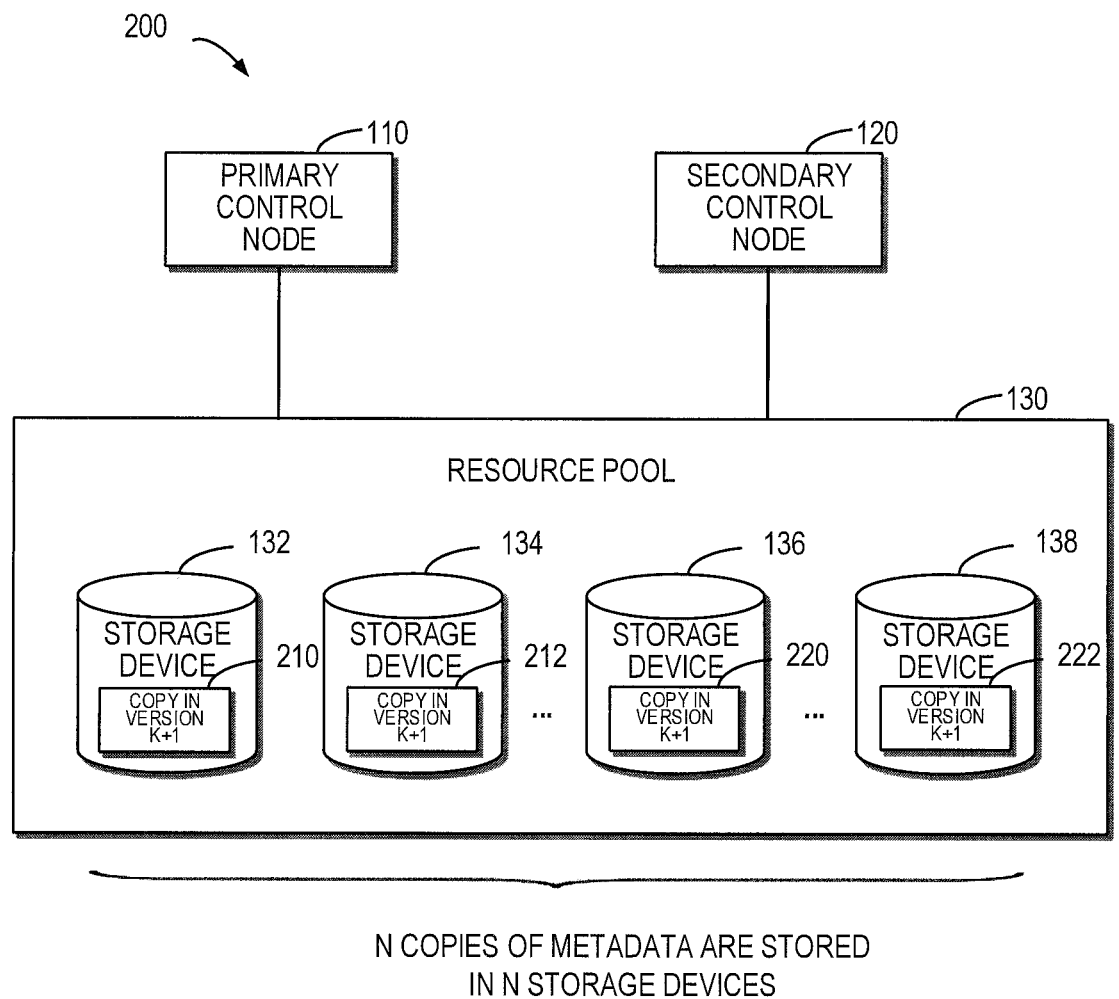
FIG. 2 schematically illustrates a block diagram for managing metadata of a storage system according to one technical solution.

It will be understood in order to ensure the normal running of the storage system 100, metadata of the storage system 100 need to be backed up if changing. Here metadata may record a mapping relation between various storage devices in the storage system 100, extent information in various storage devices, etc. During the running of the storage system 100, in order to ensure the reliability of metadata, a copy of metadata is usually stored in each of the storage devices 132, 134, 136, ..., 138 in the resource pool 130. In this way, even if some storage device(s) in the resource pool 130 fail(s), available metadata still can be found. With reference to FIG. 2, a detailed description is presented below.

FIG. 2 schematically shows a block diagram 200 for managing metadata of the storage system 100 according to one technical solution. As depicted, a copy of metadata may be stored in all storage devices in the resource pool 130. Since faults such as write failure might occur, this might lead to inconsistency in versions of copies in various storage devices. Specifically, the storage devices 136, ..., 138 may include an older version (i.e., copies 220, ..., 222 of metadata in version K) of metadata, while the storage devices 132 and 134 may include a newer version (i.e., copies 210 and 212 of metadata in version K+1) of metadata.

Storage devices in the resource pool 130 might fail, and consequently only a portion of copies in the storage system can be read successfully. At this point, a copy in the newest version may be selected from the multiple successfully read copies, and a subsequent operation may be performed based on the selected copy. For example, storage devices may boot based on the selected copy.

However, the following circumstance might arise during the running of the storage system 100. For example, when copies of updated metadata are written to various storage devices in the resource pool 130, the copies 210 and 212 of metadata in the newest version are successfully written to the storage devices 132 and 134 only. If the primary control node 110 fails, then the secondary control node 120 controls the storage system 100. Suppose glitches or other failures occur to the storage devices 132 and 134, then at this point the secondary control node 120 only can read the copies 220, ..., 222 of metadata in an older version from the normal storage devices 136, ..., 138. Even if the devices 132 and 134 are subsequently restored to normal, read metadata in version K are not in the newest version and thus cannot be used to boot the storage system 100.

Figure 3:
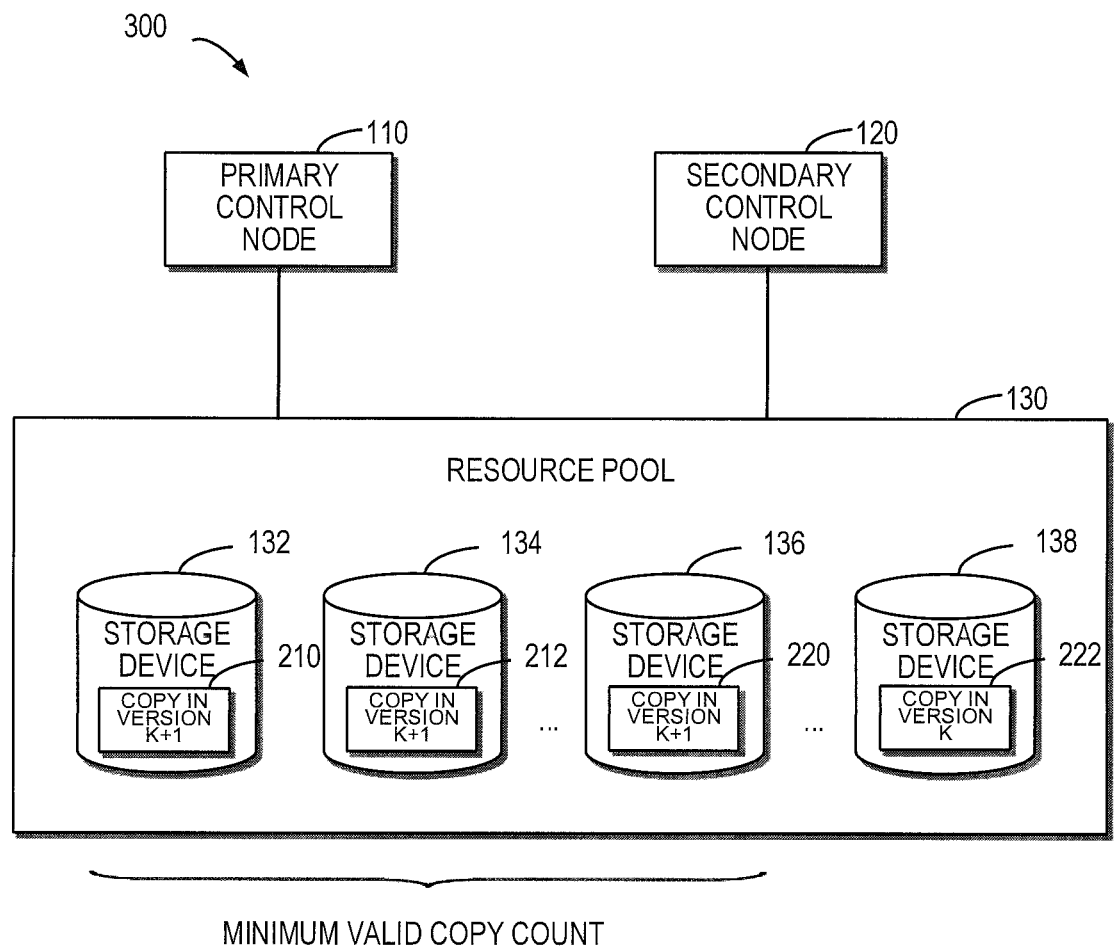
FIG. 3 schematically illustrates a block diagram for managing metadata of a storage system according to example implementations of the present disclosure.

To solve the foregoing drawbacks, implementations of the present disclosure provide a method, device and computer program product for managing the storage system 100. According to example implementations of the present disclosure, the concept "minimum copy count" is introduced, i.e., only when the count of successfully read copies of metadata is higher than the "minimum copy count," it is considered metadata in read copies are trusted. FIG. 3 schematically shows a block diagram 300 for managing metadata of the storage system 100 according to example implementations of the present disclosure.

As shown in FIG. 3, first a plurality of copies of metadata of the storage system 100 may be read from a plurality of storage devices in the resource pool 130 of the storage system 100, and the resource pool 130 includes a first number of storage devices. For example, a plurality of copies which may be read may include the copies 210, 212, 220, . . . , 222. At this point, newest copies may first be determined based on version information of various copies, i.e., a second number of copies in a newer version may be selected from the plurality of copies.

Here it should be determined whether the second number reaches the "minimum copy count" or not. If yes, it may be considered metadata in the second number of copies are trusted. It will be understood since the "minimum copy count" is associated with the number (i.e., first number) of storage devices included in the resource pool 130, it may be determined based on a comparison between the first number and the second number whether the second number reaches the "minimum copy count." According to example implementations of the present disclosure, the "minimum copy count" may be set to a value over half of the first number. In other words, it is required in example implementations of the present disclosure that copies should be successfully read from at least half of storage devices in the resource pool 130 and these copies should have the same version.

Figure 4:
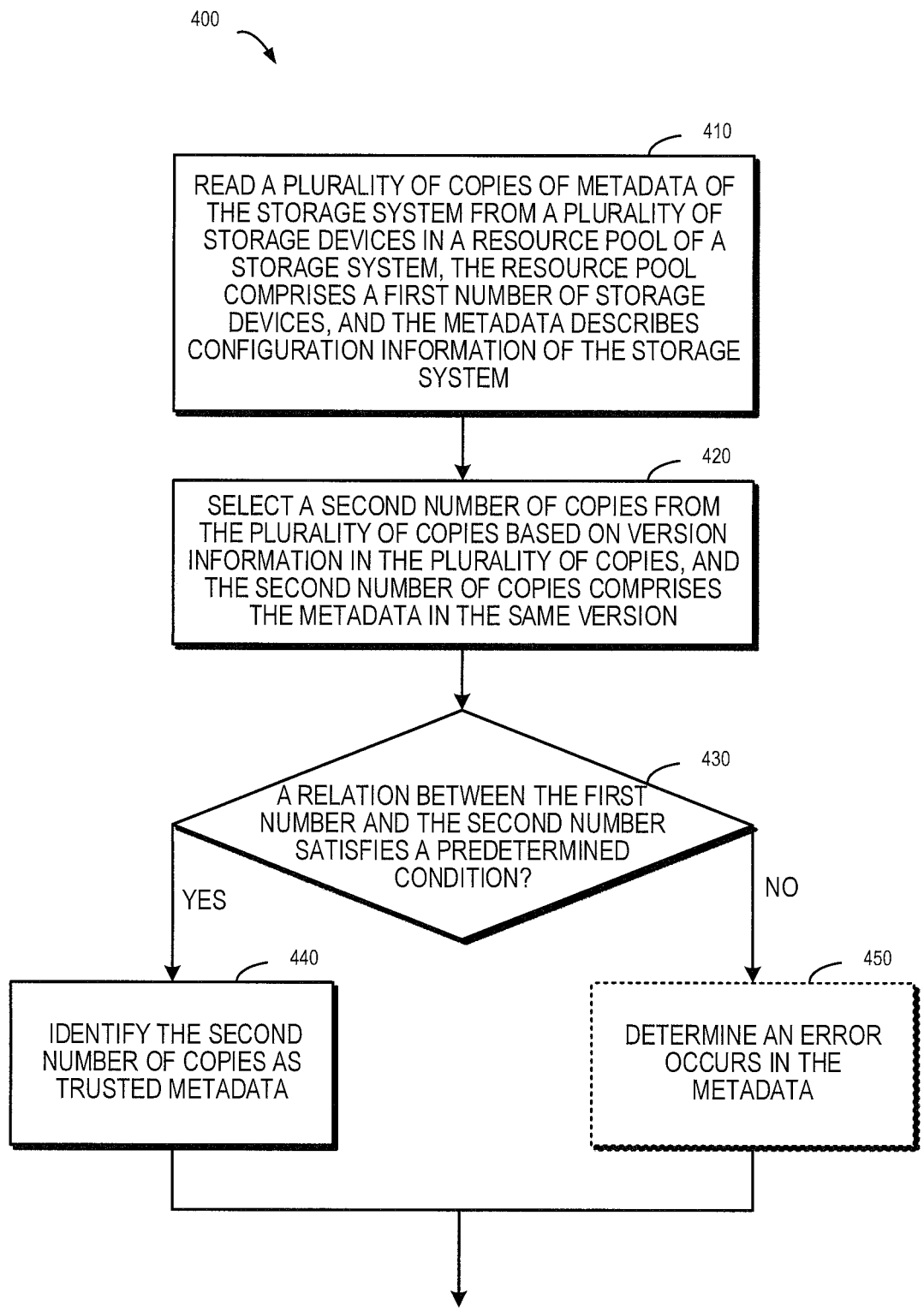
FIG. 4 schematically illustrates a flowchart of a method for managing metadata of a storage system according to example implementations of the present disclosure.

With reference to FIG. 4, description is presented below to more details on how to manage metadata. FIG. 4 schematically shows a flowchart of a method 400 for managing metadata of a storage system according to example implementations of the present disclosure. At block 410, a plurality of copies of metadata of the storage system are read from a plurality of storage devices in a resource pool of the storage system. The resource pool 130 includes a first number of storage devices, and the metadata describes configuration information of the storage system. It will be understood here the number of the plurality of copies may differ from the first number. For example, when a plurality of copies are read from only a portion of storage devices in the resource pool 130, the number of the plurality of copies is less than the first number.

Figure 5:
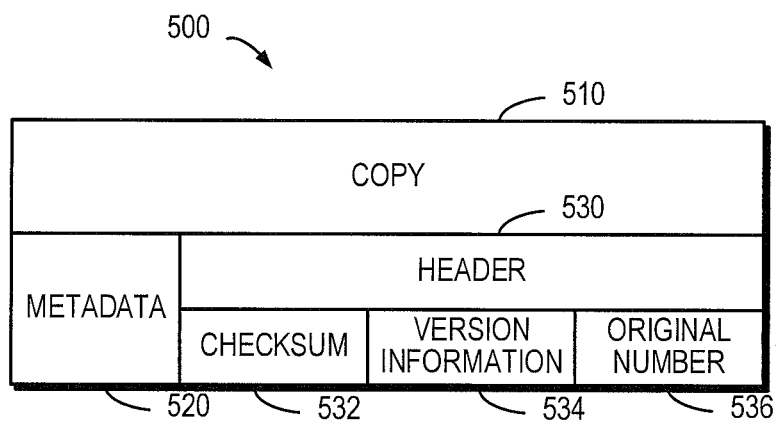
FIG. 5 schematically illustrates a block diagram of a data structure of a copy of metadata according to implementations of the present disclosure.

At block 402, a second number of copies are selected from the plurality of copies based on version information in the plurality of copies, and the second number of copies includes the metadata in the same version. With reference to FIG. 5, description is presented below to more information about copies of metadata. FIG. 5 schematically shows a block diagram 500 of a data structure of a copy of metadata according to implementations of the present disclosure. As depicted, a copy 510 of metadata may include two portions, namely metadata 520 and a header 530. Here, the header 530 may include more information for identifying the metadata 520. For example, the header 530 may include: a checksum 532 for storing a checksum value of the metadata 520 (e.g., by parity or other check method); version information 534 for identifying a version of the metadata 520; and an original number 536 for indicating the original number of storage devices included in the resource pool when a copy among the plurality of copies is written to a storage device among the plurality of storage devices.

At block 420, the version information 534 in each copy of the plurality of copies may be obtained respectively, and a second number of copies of the metadata in the same version may be selected. Suppose N represents the first number of storage devices in the resource pool 130, and M represents the second number, then at this point M≤N. Since copies might be successfully read from only a portion of storage devices and the plurality of copies may have the same or different versions, usually M<N.

Specifically, suppose the resource pool 130 includes 7 storage devices, and 6 copies are successfully read from only 6 storage devices. If 4 out of the 6 copies are in version K+1 while 2 copies are in version K, then at this point since version K+1 is the newest version, the 4 copies in version K+1 may be selected as the second number of copies.

Figure 6:
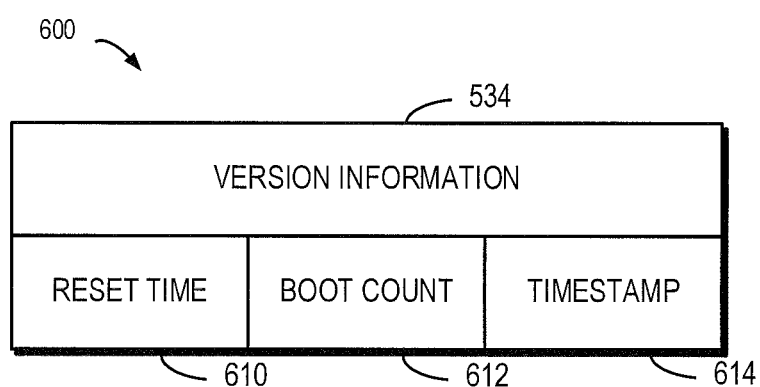
FIG. 6 schematically illustrates a block diagram of a data structure of version information according to implementations of the present disclosure.

The version information may be stored using various data structures, and depending on different data structures, various approaches may be used to determine which copy has the newest version. With reference to FIG. 6, description is presented below to more details about the version information. FIG. 6 schematically shows a block diagram 600 of a data structure of the version information according to implementations of the present disclosure. As depicted, the version information 534 may include a reset time 610 for indicating the time when the storage system 100 is reset to manufacturer settings. According to example implementations of the present disclosure, the reset time 610 may be represented using UTC (Universal Time Coordinated). Alternatively and/or additionally, the reset time 610 may further be represented as "year/month/date" or with other higher precision.

It will be understood when the storage system 100 is reset, the whole storage system 100 may be restored to original settings. Therefore, when it is determined to which version a given copy belongs, the reset time 610 in the version information 534 should be determined first. If the plurality of copies involve different reset times 610, then a group of copies with the latest reset time 610 may be selected from the plurality of copies as the second number of copies. Continuing the foregoing example, suppose the reset times 610 of the 6 read copies are Jan. 1, 2019 and Jan. 2, 2019 respectively, then at this point copies with the reset time 610 of Jan. 2, 2019 should be selected.

According to example implementations of the present disclosure, the version information 534 may further include a boot count 612 of the storage system 100 for indicating how many times the storage system 100 boots so far. It will be understood the larger the boot count 612, the newer a version of the metadata. Therefore, when the boot counts 612 in the plurality of copies are equal, a version of each copy may be determined based on the boot counts 612 in the plurality of copies. Specifically, if it is determined the boot counts 612 in at least one part of the plurality of copies are equal, then a group of copies including the largest boot count may be selected from the plurality of copies as the second number of copies. Continuing the foregoing example, suppose the reset times 610 in the 6 read copies are all Jan. 1, 2019, and the boot counts in various copies are 3 and 4 respectively, then at this point copies with the boot count of 4 should be selected.

According to example implementations of the present disclosure, the version information 534 may further include a timestamp 614 for indicating at which time point the metadata are updated. The timestamp may be represented in various ways. For example, the timestamp may be stored as UTC or a difference between the time point when the metadata in the copy are updated and a time point when the storage system 100 boots. At this point, if it is determined the at least one part of the plurality of copies include an equal boot count, then a group of copies with the latest timestamp may be selected from the at least one part of the plurality of copies as the second number of copies. Continuing the foregoing example, suppose the boot counts in the 6 read copies are all 4, and the timestamp 614 of each copy indicates the storage system 100 is updated between the $1000^{th}$ second and the $1005^{th}$ second after the storage system 100 boots, at this point copies with the timestamp of 1005 may be selected.

A detailed description has been presented on how to determine newest copies among the plurality of copies based on the version information 534. With the foregoing example implementations, there are provided various approaches to storing the version information, and it may be ensured newest versions are identified from the plurality of copies more accurately.

Returning to FIG. 4, at block 430, it may be determined whether a relation between the first number N and the second number M satisfies a predetermined condition. According to example implementations of the present disclosure, the predetermined condition may include: the second number is no less than half of the first number. In the foregoing example, there exist 7 storage devices in the resource pool 130, and metadata in the 4 successfully read copies are in the newest version; since $4 \geq [7/2]+1$, it is considered the second number satisfies the predetermined condition.

According to example implementations of the present disclosure, the predetermined condition may be described according to Formula 1 below:

$$M \geq [N/2]+1 \quad \text{Formula 1}$$

Here N denotes the number of storage devices in the resource pool 130, i.e., the first number; M denotes the number of selected copies with the newest version, i.e., the second number. It will be understood since the number of storage devices in the resource pool 130 might change, the original number of storage devices included in the resource pool 130 when a copy is written to a storage device among the plurality of storage devices needs to be taken into consideration. With reference to FIG. 5, the original number may be written to a field 536 in the header 530 of the copy 510.

According to example implementations of the present disclosure, a copy among the plurality of copies includes the original number of storage devices included in the resource pool when the copy is written to a storage device among the plurality of storage devices. It will be understood after a copy of metadata is written to a storage device, the number of storage devices in the resource pool 130 might change. For example, a new storage device may be added to the resource pool, and an original storage device in the resource pool 130 may be removed. These operations may lead to a change of the number of storage devices in the resource pool 130. By adding to a copy the number of storage devices included in the resource pool 130 when the copy is written, it may be ensured when reading a copy of metadata, even if the number of storage devices in the resource pool 130 changes, a comparison may be made based on the original number of storage devices when the copy is stored.

Figure 7:
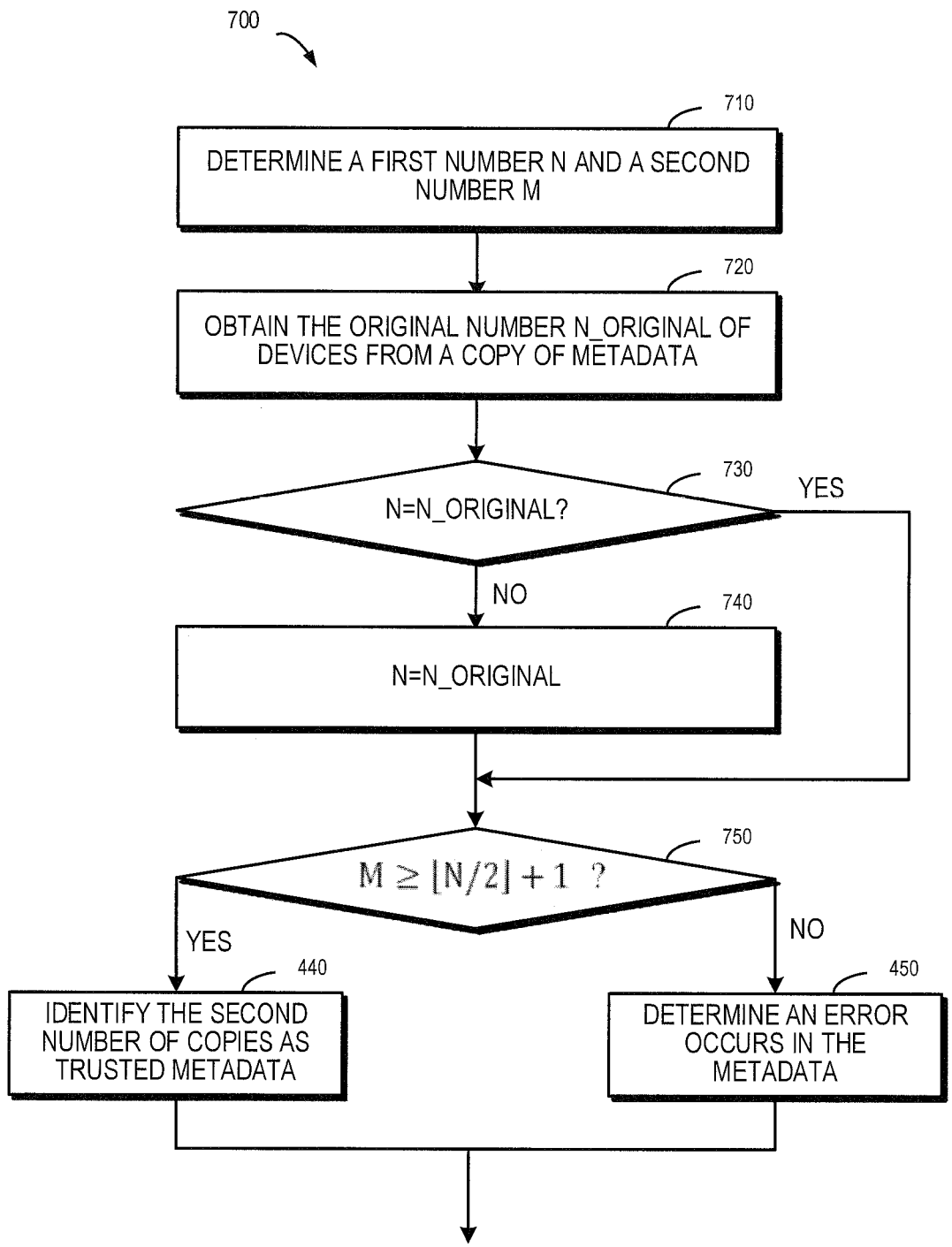
FIG. 7 schematically illustrates a flowchart of a method for judging whether a first number and a second number satisfy a predetermined condition according to example implementations of the present disclosure.

According to example implementations of the present disclosure, if the original number is different from the first number, then the latter is replaced by the former. In this way, it may be ensured the change of the number of storage devices in the resource pool 130 will not affect the reliability determining whether a copy of the metadata is trusted or not. With reference to FIG. 7, description is presented below to more details on how to determine a relation between the first number and the second number.

FIG. 7 schematically shows a flowchart of a method 700 for judging whether the first number and the second number satisfy a predetermined condition according to example implementations of the present disclosure. The method 700 starts at block 710, at which point the first number N of storage devices included in the resource pool 130 may be determined, and the second number M of copies in the newest version may be determined according to the method described above. Subsequently at block 720, the original number "N_original" of storage devices in the resource pool 130 may be read from the field 536 in the copy of the metadata. At block 730, it may be determined whether the first number N is equal to the original number "N_original" or not. If not, the method 700 then proceeds to block 740 to set the first number N to the original number N_original. If yes, the method directly proceeds to block 750 to judge whether a relation between the first number N and the second number M satisfies a predetermined condition.

At block 750, if the judgment result is "Yes," the method 700 proceeds to block 440 to identify the second number of copies as trusted metadata. If the judgment result is "No," the method 700 proceeds to block 450, at which point it may be determined an error occurs in the metadata and the storage system 100 is reminded to perform processing accordingly. With the foregoing example implementations, during the running of the storage system 100, even if the number of storage devices in the resource pool 130 changes, still it may be determined accurately whether copies contain trusted metadata.

Specifically, suppose the resource pool 130 includes 7 storage devices, then the original number "7" may be written to the field 536 when building the header in a copy. Suppose the determined second number M equals 4, a new storage device is added to the resource pool 130, and thus the first number of storage devices changes to 8 at this point. Since the number of storage devices in the resource pool 130 changes, the predetermined condition needs to be determined based on the original number 7. At this point, N=7 and M=4 still satisfy the predetermined condition indicated in Formula 1, so the metadata in the 4 read copies are trusted.

Returning to FIG. 4, at block 440, the second number of copies are identified as trusted metadata based on determining the relation satisfies the predetermined condition. At block 450 in FIG. 5, if it is determined the relation between the first number and the second number does not satisfy the predetermined condition, then it may be determined an error occurs in the metadata. It will be understood operations shown at blocks 440 and 450 in FIG. 4 are identical to those shown at blocks 440 and 450 in FIG. 7 and thus are ignored. With the foregoing example implementations, when the metadata is being updated, even if the storage system 100 fails, the metadata may be managed in a reliable way and further the normal running of the storage system 100 may be ensured.

According to example implementations of the present disclosure, a copy among the plurality of copies may include a checksum of the metadata. Here the checksum may be used to verify whether the metadata 520 in the copy 510 are tampered with. If it is determined the checksum matches the metadata, then this means the metadata 520 in the copy 510 are trusted. Subsequently, the storage system 100 may boot based on the trusted metadata. It will be understood any copy may be selected from the second number of copies, and it may be determined whether a checksum in the copy matches the metadata.

According to example implementations of the present disclosure, if it is determined none of checksums included in the second number of copies matches the metadata, then it is determined an error occurs in the metadata. Such situation indicates although the number of successfully read copies satisfies the predetermined condition, an error might occur when writing copies, and consequently each successfully read copy is untrusted. At this point, it may be determined an error occurs in the metadata, and the storage system 100 may be reminded to perform further processing.

According to example implementations of the present disclosure, copies in the plurality of storage devices may be written at different time points. A first group of copies among the plurality of copies are written to a first group of storage devices included in the resource pool, and a second group of copies among the plurality of copies are written to a second group of storage devices included in the resource pool, the time when the first group of copies are written being earlier than the time when the second group of copies are written Before being written, a version of copies included in the first group of storage devices being earlier than a version of copies included in the second group of storage devices.

According to example implementations of the present disclosure, a copy of the metadata may be written to each storage device in the resource pool 130. Since a failure or other abnormality might occur in a storage device during a write, copies of the metadata may be first written to a group of storage devices that store copies in an earlier version. After the write is performed successfully, copies of the metadata are written to a group of storage devices that used to store copies in a newer version. More details will be described with reference to FIG. 8.

Figure 8:
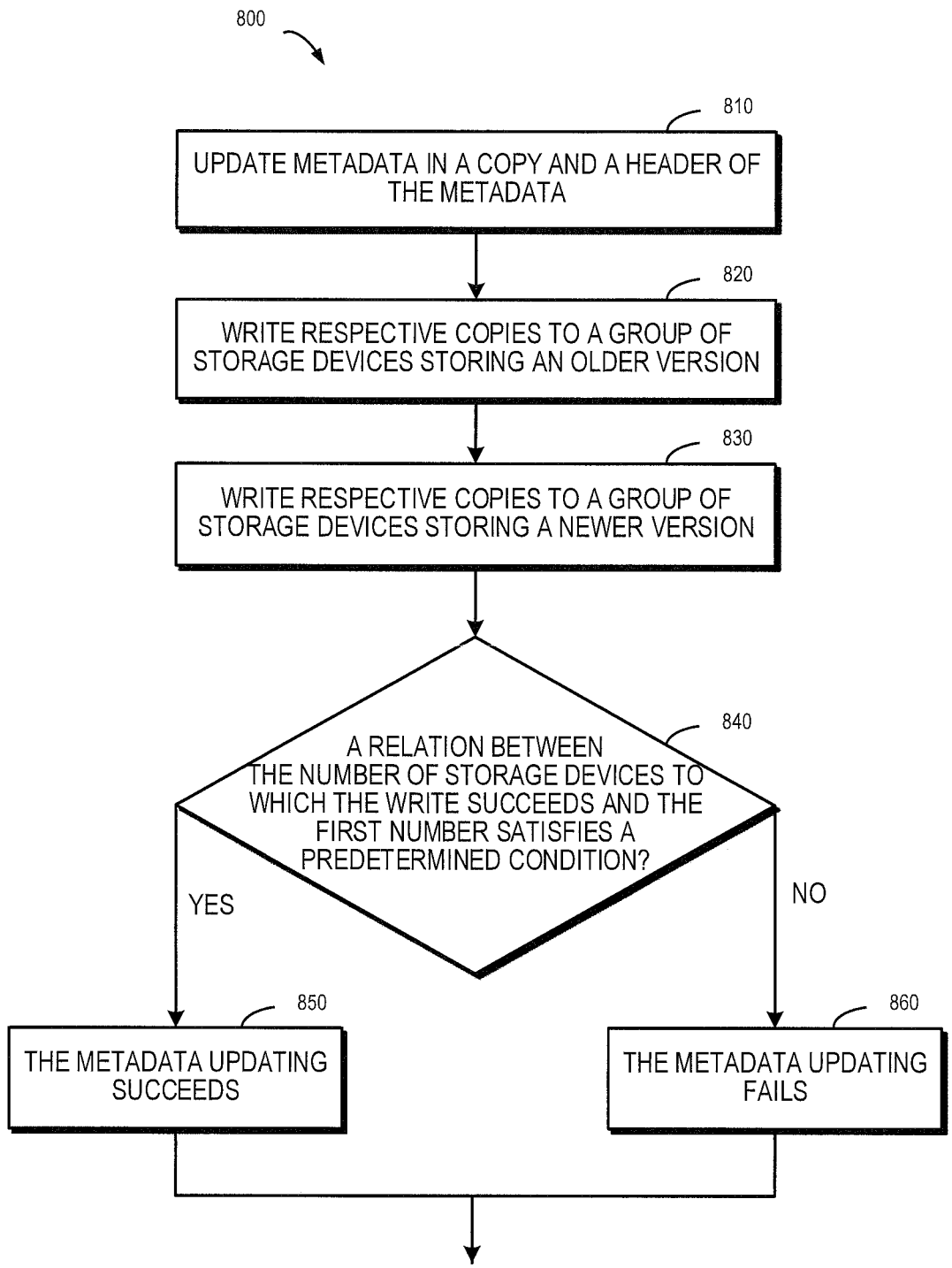
FIG. 8 schematically illustrates a flowchart of a method for writing copies of metadata to multiple storage devices in a resource pool according to example implementations of the present disclosure.

FIG. 8 schematically shows a flowchart of a method 800 for writing copies of metadata to a plurality of storage devices in a resource pool according to example implementations of the present disclosure. As depicted, at block 810, metadata in a copy and a header of the metadata are updated. At this point, the metadata are updated from version K to version K+1. At block 820, respective copies are first written to a group of storage devices storing an older version. It will be understood since a storage device might fail during the operation, this will result in inconsistency in versions of copies in various storage devices in the resource pool 130. For example, some storage devices might store copies in version K, while others might store copies in version K−1. At this point, copies in version K+1 should first be written to a group of storage devices where copies in version K−1 are stored.

At block 830, respective copies are written to a group of storage devices storing a newer version. At this point, after copies in version K+1 are written to the group of storage devices where copies in version K−1 are stored, copies in version K+1 are written to a group of storage devices where copies in version K are stored. When writing copies of updated metadata, still it should be ensured the number of storage devices to which the write succeeds satisfies the predetermined condition. In other words, it needs to be ensured the number of storage devices to which the write succeeds is no less than a half of the number of storage devices in the resource pool 130. At block 840, it needs to be determined whether the number U of storage devices to which the write succeeds and the number N of storage devices in the resource pool 130 satisfy a formula below:

$$U \geq [N/2]+1 \qquad \text{Formula 2}$$

If the judgment result at block 840 is "Yes," then the method 800 proceeds to block 850 to indicate the metadata updating succeeds. If the judgment result at block 840 is "No," then the method 800 proceeds to block 860 to indicate the metadata updating fails. In this way, even if a failure occurs during the write, it may be ensured a copy of trusted metadata can be obtained when the predetermined condition is satisfied.

Suppose copies in version K+1 want to be written to N storage devices in the resource pool 130. At this point, among the N storage devices, there are U storage devices (storing copies in version K) to which a previous write succeeds and F storage devices (storing copies in version K−1) to which the previous write fails. At this point, C=U+F, and U and N should satisfy Formula 2. First copies in version K+1 are written to the F storage devices. Suppose a fault occurs in the storage system 100 and leads to write failure. Since the U storage devices includes copies in version K, and the relation between U and N satisfy Formula 2, metadata in copies in version K in the U storage devices are trusted.

Suppose copies in version K+1 are successfully written to the F storage devices, and a fault occurs in the storage system 100 when writing copies in version K+1 to the U storage devices. Suppose copies in version K+1 are successfully written to X (1≤X≤U) out of the U storage devices, then at this point the resource pool 130 includes F+X storage devices including copies in version K+1. Since F+X≥[N/2]+1, it still can be ensured metadata in copies in version K+1 in the F+X storage devices are trusted. Even if a new storage device is added to the resource pool 130 during the write procedure, still the "minimum copy count" of copies can be guaranteed in the resource pool 130. Therefore, with the foregoing example implementations, metadata of the storage system 100 may be managed with higher reliability.

While examples of the method according to the present disclosure have been described in detail with reference to FIGS. 2 to 8, description is presented below to the implementation of a corresponding apparatus. According to example implementations of the present disclosure, provided is an apparatus for managing a storage system. The apparatus includes: a reading module configured to read a plurality of copies of metadata of the storage system from a plurality of storage devices in a resource pool of the storage system, the resource pool including a first number of storage devices, and the metadata describing configuration information of the storage system; a selecting module configured to select a second number of copies from the plurality of copies based on version information in the plurality of copies, the second number of copies including the metadata in the same version; a determining module configured to determine whether a relation between the first number and the second number satisfies a predetermined condition; and an identifying module configured to identify the second number of copies as trusted metadata based on determining the relation satisfies the predetermined condition.

According to example implementations of the present disclosure, the apparatus further includes: an error determining module configured to determine an error occurs in the metadata in response to determining the relation does not satisfy the predetermined condition.

According to example implementations of the present disclosure, a copy among the plurality of copies includes the original number of storage devices included in the resource pool when the copy is written to a storage device among the plurality of storage devices, and the determining module is further configured to replace the first number with the original number in response to the original number differing from the first number.

According to example implementations of the present disclosure, the version information includes a reset time of the storage system, and the selecting module is further configured to select a group of copies with the latest reset time from the plurality of copies as the second number of copies in response to determining reset times included in the plurality of copies are different.

According to example implementations of the present disclosure, the version information further includes a boot count of the storage system, and the selecting module is further configured to select a group of copies with the largest boot count from at least one part of the plurality of copies as the second number of copies in response to determining reset times included in the at least one part of the plurality of copies are the same.

According to example implementations of the present disclosure, the version information further includes a timestamp when the metadata are updated, and the selecting module is further configured to select a group of copies with the latest timestamp from at least one part of the plurality of copies as the second number of copies in response to determining boot counts included in the at least one part of the plurality of copies are the same.

According to example implementations of the present disclosure, the predetermined condition includes: the second number is no less than half of the first number.

According to example implementations of the present disclosure, a copy among the plurality of copies includes a checksum of the metadata, and the identifying module is further configured to determine the copy of the metadata is trusted in response to determining the checksum matches the metadata; and boot the storage system based on the trusted metadata.

According to example implementations of the present disclosure, the identifying module is further configured to determine an error occurs in the metadata in response to determining a checksum included in any copy among the second number of copies does not match the metadata.

According to example implementations of the present disclosure, a first group of copies among the plurality of copies are written to a first group of storage devices included in the resource pool, and a second group of copies among the plurality of copies are written to a second group of storage devices included in the resource pool, the time when the first group of copies are written being earlier than the time when the second group of copies are written, and before the first group of storage devices are written, a version of copies included in the first group of storage devices is earlier than a version of copies included in the second group of storage devices.

Figure 9:
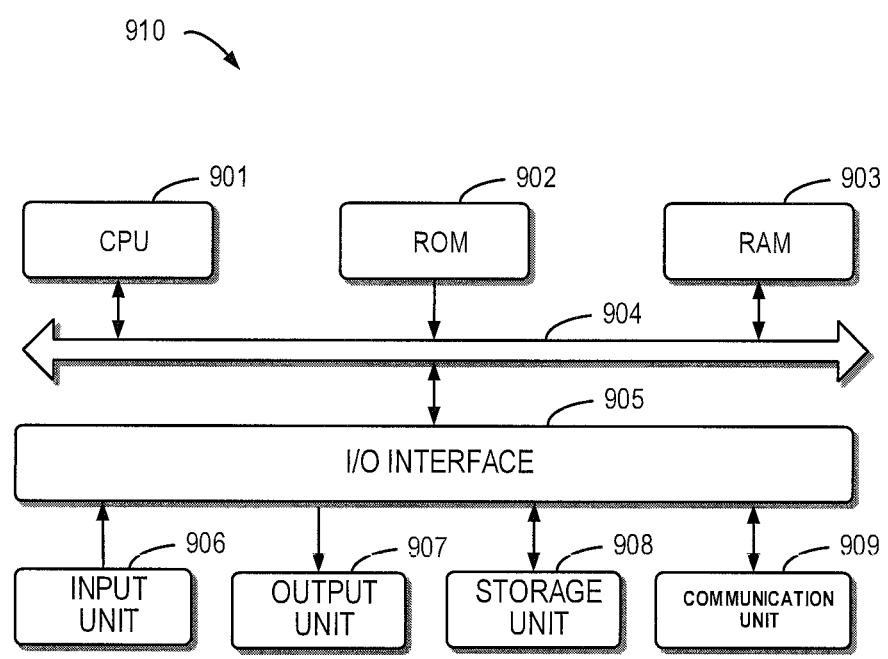
FIG. 9 schematically illustrates a block diagram of a device for managing a storage system according to example implementations of the present disclosure.

FIG. 9 schematically shows a block diagram of a device 900 for managing a storage system according to example implementations of the present disclosure. As depicted, the device 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described each process and treatment, such as the methods 400, 700 and 800 can also be executed by the processing unit 901. For example, in some implementations, the methods 400, 700 and 800 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described methods 400, 700 and 800 can be implemented. Alternatively, in other implementations, the CPU 901 also can be configured in other suitable manners to realize the above procedure/method.

According to example implementations of the present disclosure, there is provided a device for managing a storage system, the device including: at least one processor; a volatile memory (e.g., see the RAM 903 in FIG. 9); and a memory (e.g., see the ROM 902 in FIG. 9) coupled to the at least one processor, the memory having instructions stored thereon. The instructions, when executed by the at least one processor (e.g., when the instructions are loaded from the memory into the volatile memory for execution), causes the apparatus to perform acts. The acts include: reading a plurality of copies of metadata of the storage system from a plurality of storage devices in a resource pool of the storage system, the resource pool including a first number of storage devices, and the metadata describing configuration information of the storage system; selecting a second number of copies from the plurality of copies based on version information in the plurality of copies, the second number of copies including the metadata in the same version; determining whether a relation between the first number and the second number satisfies a predetermined condition; and identifying the second number of copies as trusted metadata based on determining the relation satisfies the predetermined condition.

According to example implementations of the present disclosure, the acts further include: determining an error occurs in the metadata in response to determining the relation does not satisfy the predetermined condition.

According to example implementations of the present disclosure, a copy among the plurality of copies includes the original number of storage devices included in the resource pool when the copy is written to a storage device among the plurality of storage devices.

According to example implementations of the present disclosure, the acts further include: replacing the first number with the original number in response to the original number differing from the first number.

According to example implementations of the present disclosure, the version information includes a reset time of the storage system, and selecting the second number of copies from the plurality of copies includes: selecting a group of copies with the latest reset time from the plurality of copies as the second number of copies in response to determining reset times included in the plurality of copies are different.

According to example implementations of the present disclosure, the version information further includes a boot count of the storage system, and selecting the second number of copies from the plurality of copies includes: selecting a group of copies with the largest boot count from at least one part of the plurality of copies as the second number of copies in response to determining reset times included in the at least one part of the plurality of copies are the same.

According to example implementations of the present disclosure, the version information further includes a timestamp when the metadata are updated, and selecting the second number of copies from the plurality of copies includes: selecting a group of copies with the latest timestamp from at least one part of the plurality of copies as the second number of copies in response to determining boot counts included in the at least one part of the plurality of copies are the same.

According to example implementations of the present disclosure, the predetermined condition includes: the second number is no less than half of the first number.

According to example implementations of the present disclosure, a copy among the plurality of copies includes a checksum of the metadata, and the acts further include: determining the copy of the metadata is trusted in response to determining the checksum matches the metadata; and booting the storage system based on the trusted metadata.

According to example implementations of the present disclosure, the acts further include: determining an error occurs in the metadata in response to determining a checksum included in any copy among the second number of copies does not match the metadata.

According to example implementations of the present disclosure, a first group of copies among the plurality of copies are written to a first group of storage devices included in the resource pool, and a second group of copies among the plurality of copies are written to a second group of storage devices included in the resource pool, the time when the first group of copies are written being earlier than the time when the second group of copies are written, and before the first group of storage devices are written, a version of copies included in the first group of storage devices is earlier than a version of copies included in the second group of storage devices.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage system, the method comprising:
   reading a plurality of copies of metadata of the storage system from a plurality of storage devices in a resource pool of the storage system, the resource pool comprising a first number of storage devices, and the metadata describing configuration information of the storage system;
   selecting a second number of copies from the plurality of copies based on version information in the plurality of copies, the second number of copies comprising the metadata in the same version;
   determining whether a relation between the first number and the second number satisfies a predetermined condition; and
   identifying the second number of copies as trusted metadata based on determining the relation satisfies the predetermined condition;
   wherein the version information comprises a reset time of the storage system, and selecting the second number of copies from the plurality of copies comprises:
   selecting a group of copies with the latest reset time from the plurality of copies as the second number of copies in response to determining reset times included in the plurality of copies are different.

2. The method of claim 1, wherein identifying the second number of copies as trusted metadata based on determining the relation satisfies the predetermined condition occurs at a first time; and wherein the method further comprises:
   at a second time that is different from the first time, determining an error occurs in the metadata in response to determining the relation does not satisfy the predetermined condition.

3. The method of claim 1, wherein a copy among the plurality of copies comprises the original number of storage devices included in the resource pool when the copy is written to a storage device among the plurality of storage devices, and the method further comprises:
   replacing the first number with the original number in response to the original number differing from the first number.

4. The method of claim 1, wherein the version information further comprises a boot count of the storage system, and selecting the second number of copies from the plurality of copies comprises:
   selecting a group of copies with the largest boot count from at least one part of the plurality of copies as the second number of copies in response to determining reset times included in the at least one part of the plurality of copies are the same.

5. The method of claim 4, wherein the version information further comprises a timestamp when the metadata is updated, and selecting the second number of copies from the plurality of copies comprises:
   selecting a group of copies with the latest timestamp from at least one part of the plurality of copies as the second number of copies in response to determining boot counts included in the at least one part of the plurality of copies are the same.

6. The method of claim 1, wherein the predetermined condition comprises: the second number is no less than half of the first number.

7. The method of claim 1, wherein a copy among the plurality of copies comprises a checksum of the metadata, and the method further comprises:
   determining the copy of the metadata is trusted in response to determining the checksum matches the metadata; and
   booting the storage system based on the trusted metadata.

8. The method of claim 7, further comprising:
   determining an error occurs in the metadata in response to determining a checksum included in any copy among the second number of copies does not match the metadata.

9. The method of claim 1, wherein
   a first group of copies among the plurality of copies are written to a first group of storage devices included in the resource pool, and a second group of copies among the plurality of copies are written to a second group of storage devices included in the resource pool, the time when the first group of copies are written being earlier than the time when the second group of copies are written, and
   before the first group of storage devices are written, a version of copies included in the first group of storage devices is earlier than a version of copies included in the second group of storage devices.

10. A device for managing a storage system, comprising:
at least one processor;
a volatile memory; and
a memory coupled to the at least one processor and having instructions stored thereon, the instructions, when executed from the volatile memory by the at least one processor, causing the apparatus to perform acts comprising:
reading a plurality of copies of metadata of the storage system from a plurality of storage devices in a resource pool of the storage system, the resource pool comprising a first number of storage devices, and the metadata describing configuration information of the storage system;
selecting a second number of copies from the plurality of copies based on version information in the plurality of copies, the second number of copies comprising the metadata in the same version;
determining whether a relation between the first number and the second number satisfies a predetermined condition; and
identifying the second number of copies as trusted metadata based on determining the relation satisfies the predetermined condition; and
wherein the version information comprises a reset time of the storage system, and selecting the second number of copies from the plurality of copies comprises:
selecting a group of copies with the latest reset time from the plurality of copies as the second number of copies in response to determining reset times included in the plurality of copies are different.

11. The device of claim 10, wherein identifying the second number of copies as trusted metadata based on determining the relation satisfies the predetermined condition occurs at a first time; and
wherein the acts further comprise:
at a second time that is different from the first time, determining an error occurs in the metadata in response to determining the relation does not satisfy the predetermined condition.

12. The device of claim 10, wherein a copy among the plurality of copies comprises the original number of storage devices included in the resource pool when the copy is written to a storage device among the plurality of storage devices, and the acts further comprise:
replacing the first number with the original number in response to the original number differing from the first number.

13. The device of claim 10, wherein the version information further comprises a boot count of the storage system, and selecting the second number of copies from the plurality of copies comprises:
selecting a group of copies with the largest boot count from at least one part of the plurality of copies as the second number of copies in response to determining reset times included in the at least one part of the plurality of copies are the same.

14. The device of claim 13, wherein the version information further comprises a timestamp when the metadata are updated, and selecting the second number of copies from the plurality of copies comprises:
selecting a group of copies with the latest timestamp from at least one part of the plurality of copies as the second number of copies in response to determining boot counts included in the at least one part of the plurality of copies are the same.

15. The device of claim 10, wherein the predetermined condition comprises: the second number is no less than half of the first number.

16. The device of claim 10, wherein a copy among the plurality of copies comprises a checksum of the metadata, and the acts further comprise:
determining the copy of the metadata is trusted in response to determining the checksum matches the metadata; and
booting the storage system based on the trusted metadata.

17. The device of claim 10, wherein
a first group of copies among the plurality of copies are written to a first group of storage devices included in the resource pool, and a second group of copies among the plurality of copies are written to a second group of storage devices included in the resource pool, the time when the first group of copies are written being earlier than the time when the second group of copies are written, and
before the first group of storage devices are written, a version of copies included in the first group of storage devices is earlier than a version of copies included in the second group of storage devices.

18. A computer program product having a non-transitory computer readable medium which stores a set of instructions to manage a storage system; the set of instructions, when carried out by computerized circuitry, causing the computerized circuitry to perform a method of:
reading a plurality of copies of metadata of the storage system from a plurality of storage devices in a resource pool of the storage system, the resource pool comprising a first number of storage devices, and the metadata describing configuration information of the storage system;
selecting a second number of copies from the plurality of copies based on version information in the plurality of copies, the second number of copies comprising the metadata in the same version;
determining whether a relation between the first number and the second number satisfies a predetermined condition; and
identifying the second number of copies as trusted metadata based on determining the relation satisfies the predetermined condition; and
wherein the version information comprises a reset time of the storage system, and selecting the second number of copies from the plurality of copies comprises:
selecting a group of copies with the latest reset time from the plurality of copies as the second number of copies in response to determining reset times included in the plurality of copies are different.

19. A method for managing a storage system, the method comprising:
reading a plurality of copies of metadata of the storage system from a plurality of storage devices in a resource pool of the storage system, the resource pool comprising a first number of storage devices, and the metadata describing configuration information of the storage system;
selecting a second number of copies from the plurality of copies based on version information in the plurality of copies, the second number of copies comprising the metadata in the same version;

determining whether a relation between the first number and the second number satisfies a predetermined condition; and identifying the second number of copies as trusted metadata based on determining the relation satisfies the predetermined condition; and wherein a copy among the plurality of copies comprises the original number of storage devices included in the resource pool when the copy is written to a storage device among the plurality of storage devices, and the method further comprises:

replacing the first number with the original number in response to the original number differing from the first number.

20. A method for managing a storage system, the method comprising:

reading a plurality of copies of metadata of the storage system from a plurality of storage devices in a resource pool of the storage system, the resource pool comprising a first number of storage devices, and the metadata describing configuration information of the storage system;

selecting a second number of copies from the plurality of copies based on version information in the plurality of copies, the second number of copies comprising the metadata in the same version;

determining whether a relation between the first number and the second number satisfies a predetermined condition; and identifying the second number of copies as trusted metadata based on determining the relation satisfies the predetermined condition; and wherein a copy among the plurality of copies comprises a checksum of the metadata, and the method further comprises:

determining the copy of the metadata is trusted in response to determining the checksum matches the metadata; and booting the storage system based on the trusted metadata.

21. The method of claim 20, further comprising:

determining an error occurs in the metadata in response to determining a checksum included in any copy among the second number of copies does not match the metadata.

* * * * *